US012798137B2

(12) United States Patent
Centorame et al.

(10) Patent No.: US 12,798,137 B2
(45) Date of Patent: Nov. 17, 2026

(54) METHOD FOR TRANSVERSE CUTTING OF A WATER-SOLUBLE TAPE

(71) Applicant: Fameccanica.Data S.p.A., San Giovanni Teatino (IT)

(72) Inventors: Oscar Centorame, San Giovanni Teatino (IT); Massimiliano D'Aurizio, San Giovanni Teatino (IT)

(73) Assignee: Fameccanica.Data S.p.A.

( * ) Notice: Subject to any disclaimer, the term of this patent is extended or adjusted under 35 U.S.C. 154(b) by 469 days.

(21) Appl. No.: 18/338,445

(22) Filed: Jun. 21, 2023

(65) Prior Publication Data

US 2023/0415367 A1 Dec. 28, 2023

(30) Foreign Application Priority Data

Jun. 22, 2022 (IT) ........................ 102022000013189

(51) Int. Cl.

| | |
|---|---|
| ***B26D 1/147*** | (2006.01) |
| ***B26D 1/00*** | (2006.01) |
| ***B26D 1/20*** | (2006.01) |
| ***B26D 5/00*** | (2006.01) |

(52) U.S. Cl.

CPC ........... *B26D 1/1475* (2013.01); *B26D 1/205* (2013.01); *B26D 5/00* (2013.01); *B26D 2001/0046* (2013.01)

(58) Field of Classification Search

CPC ........ B26D 1/147; B26D 1/1475; B26D 1/20; B26D 1/205; B26D 5/00

See application file for complete search history.

(56) References Cited

U.S. PATENT DOCUMENTS

| | | | | |
|---|---|---|---|---|
| 3,899,945 | A * | 8/1975 | Garrett | B26F 1/384 83/72 |
| 5,151,636 | A * | 9/1992 | Winebarger | B26D 5/00 318/446 |
| 6,428,001 | B1 * | 8/2002 | Jackson | B65H 29/68 271/182 |
| 7,578,501 | B2 * | 8/2009 | Noll, Jr. | B65H 39/043 271/182 |
| 8,602,957 | B2 * | 12/2013 | Sandahl | B65H 35/0006 493/359 |
| 9,434,083 | B2 * | 9/2016 | Douillard | B26F 1/20 |
| 11,124,326 | B2 | 9/2021 | Vitiello et al. | |
| 2009/0321021 | A1 | 12/2009 | Yamamoto | |
| 2010/0101386 | A1 * | 4/2010 | Jackson | B26F 1/0092 83/287 |
| 2017/0101204 | A1 | 4/2017 | Waterman et al. | |
| 2017/0173812 | A1 * | 6/2017 | Oakes | B26D 1/405 |

FOREIGN PATENT DOCUMENTS

| | | |
|---|---|---|
| CN | 105438558 A | 3/2016 |
| CN | 105539902 A | 5/2016 |

OTHER PUBLICATIONS

Search Report dated Feb. 18, 2023. 8 pages.

* cited by examiner

*Primary Examiner* — Boyer D Ashley
*Assistant Examiner* — Richard D Crosby, Jr.
(74) *Attorney, Agent, or Firm* — RMCK Law Group PLC

(57) ABSTRACT

A method of making single-dose capsules includes cutting transverse flat areas of a water-soluble tape by a rotating knife roller and an anvil.

10 Claims, 5 Drawing Sheets

METHOD FOR TRANSVERSE CUTTING OF A WATER-SOLUBLE TAPE

CROSS-REFERENCE TO RELATED APPLICATION

This application claims priority to Italian Patent Application No. 102022000013189 filed Jun. 22, 2022. The disclosure of the above application is incorporated herein by reference in its entirety.

FIELD OF THE INVENTION

The present invention relates to the production of single-dose capsules, for example, single-dose capsules containing home-care compositions, such as laundry detergents, dishwasher detergents, fabric softeners and other compositions used in household appliances.

More precisely, the invention relates to a method for transverse cutting of a water-soluble tape.

BACKGROUND OF THE INVENTION

Single-dose capsules are water-soluble sachets containing laundry or dishwasher detergents, fabric softeners or other products for household appliances. Single-dose capsules are becoming increasingly popular due to the ease of use for the user. Single-dose detergent capsules also have a positive impact on sustainability as they contain the precise dose of detergent for one load and are a way to reduce waste.

Single-dose capsules are generally produced by forming recesses in a first water-soluble film, filling the recesses with fluid or powder compositions, applying a second water-soluble film over the first water-soluble film, and binding the first and second water-soluble films together to seal the compositions between the two water-soluble films.

Machines for producing single-dose capsules generally form a water-soluble tape movable in a machine direction, comprising a plurality of single-dose capsules joined together by flat areas in which the first and second water-soluble films are joined in contact with each other. In the water-soluble tape, the single-dose capsules are arranged in a plurality of transverse rows and in a plurality of longitudinal rows. The water-soluble tape is then cut transversely and in a longitudinal direction along the flat areas to form individual single-dose capsules.

U.S. Ser. No. 11/124,326B2 discloses a method for cutting a water-soluble tape in the transverse direction, said tape being formed by transverse and longitudinal rows of single-dose capsules joined together. The transverse cut is carried out by a cutting unit comprising an anvil and a knife roller rotating around respective parallel axes. The water-soluble tape moves in a machine direction at a speed V1, and is passed between the anvil and the knife roller. Advantageously, the speed V1 may be constant.

The knife roller comprises one or more blades and rotates at a variable speed. When cutting the water-soluble tape, the knife roller blades move at the same speed as the water-soluble tape.

The cutting of the water-soluble film by means of a knife roller equipped with blades that act on an anvil requires mechanical interference between the blades and the anvil. The interference value necessary for the system to be able to cut the water-soluble film depends on many factors, linked both to the properties of the material to be cut and to the cutting technology used. The interference between the blades and the anvil generates mechanical stresses, so that it would be desirable to reduce the degree of interference as much as possible, without however affecting the ability to effectively make the cut.

The cutting units, to reduce to a minimum the interference values, must be made with particular constructive attention in terms of precision and stiffness. A high construction accuracy may reduce but hardly eliminate alignment errors, concentricity, or defects of the knife blades, which require greater interference and cutting forces to be compensated for.

OBJECT AND SUMMARY OF THE INVENTION

The object of the present invention is to provide a method for transverse cutting of a water-soluble tape that overcomes the problems of the prior art.

According to the present invention, this object is achieved by a method having the characteristics of claim 1.

Optional characteristics of the invention form the subject of the dependent claims.

The claims form an integral part of the disclosure provided here in relation to the invention.

BRIEF DESCRIPTION OF THE DRAWINGS

Further characteristics and advantages of the invention will become clear from the detailed description that follows, given purely by way of non-limiting example, with reference to the attached drawings, in which.

It will be appreciated that the accompanying drawings are schematic and that some components may not be for a better understanding of the figures. It will be appreciated that the various figures may also not be represented on the same scale.

DETAILED DESCRIPTION

Figure 1:
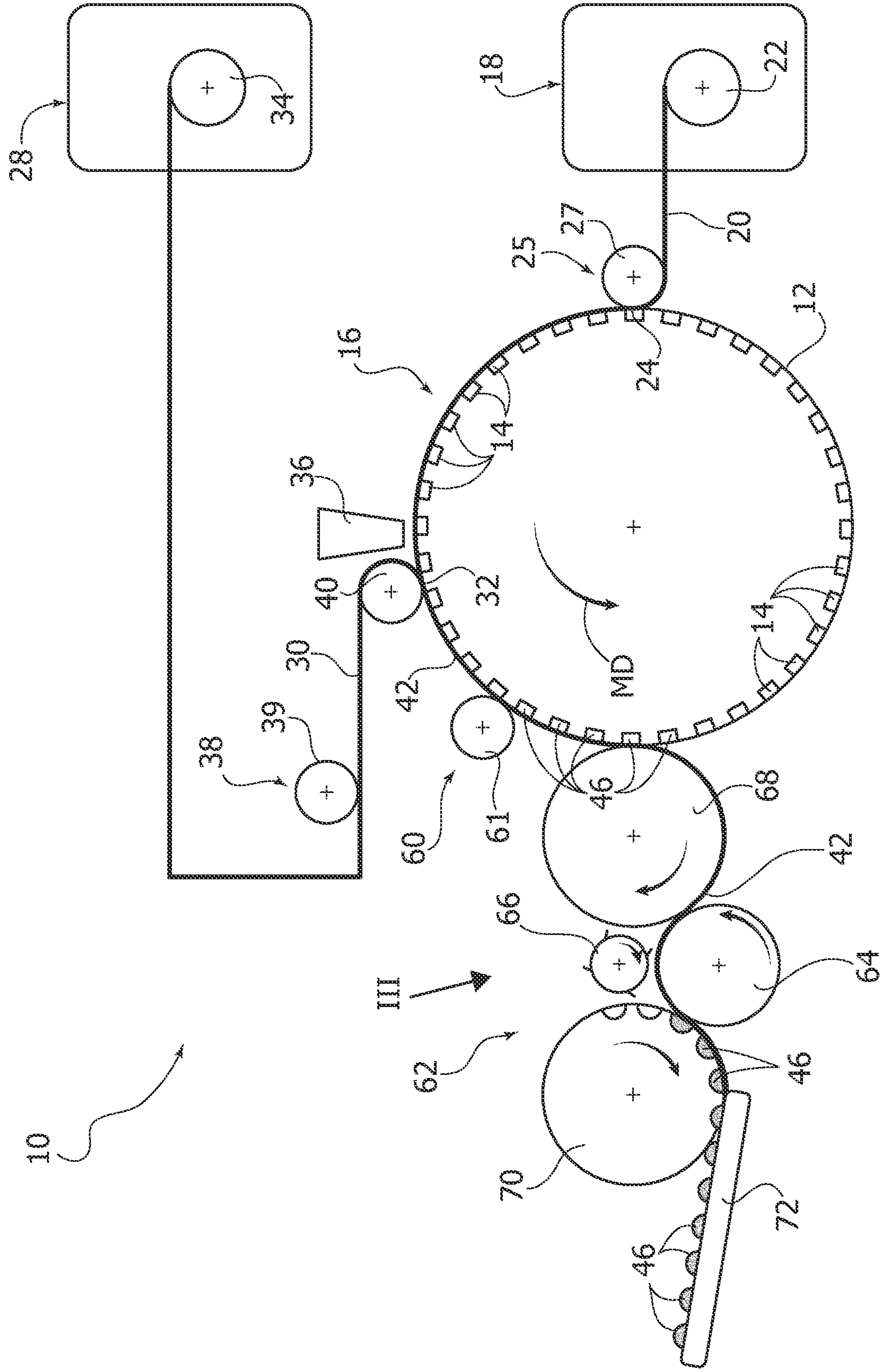
FIG. 1 is a schematic view of a machine for producing single-dose capsules.

With reference to FIG. 1, a machine for producing single-dose capsules is indicated by the reference number 10.

The machine 10 comprises a forming surface 12 having a plurality of cavities 14, continuously movable in a machine direction MD. In the embodiment shown in FIG. 1, the forming surface 12 is the outer cylindrical surface of a wheel 16 rotating about a horizontal axis A. In a possible embodiment, the forming surface 12 may be the outer surface of a closed-loop belt.

The machine 10 comprises a first feeding unit 18 configured to feed a first continuous water-soluble film 20 onto the forming surface 12. The first continuous water-soluble film 20 is unwound from a first reel 22 and is fed to the forming surface 12 at a first position 24.

The machine 10 may comprise a heating device 25 arranged to heat the first continuous water-soluble film upstream of the forming surface 12. The heating device may comprise a heated roller 27, which is in contact with the first continuous water-soluble film 20 upstream of the first position 24.

The first continuous water-soluble film 20 is retained on the forming surface 12 while moving in the machine direction MD. The first continuous water-soluble film 20 may be retained on the forming surface 12 by mechanical retaining elements, which act on the lateral edges of the first continuous water-soluble film 20, for example, by belts which hold the lateral edges of the first continuous water-soluble film 20 on the outer surface of the wheel 16.

The first continuous water-soluble film 20 deforms in the cavities 14 of the forming surface 12 while moving in the machine direction MD. The deformation of the first continuous water-soluble film 20 at the cavities 14 may be obtained by a suction system comprising a plurality of holes opened on the surfaces of the cavities 14 and fluidly connected to a stationary suction chamber connected to a sub-atmospheric pressure source. The first continuous water-soluble film 20 is kept adherent to the walls of the cavities 14 by said suction system, so that a plurality of recesses are formed in the first continuous water-soluble film 20, having the same shape as the cavities 14.

The machine 10 comprises a second feeding unit 28 configured to feed a second continuous water-soluble film onto the forming surface 12 at a second position 32 located downstream of the first position 24 with respect to the machine direction MD. The second continuous water-soluble film 30 is unwound from a second reel 34.

The machine 10 comprises a dosing apparatus 36 configured to dispense metered quantities of at least one composition into the recesses of the first continuous water-soluble film 20, which are arranged at the cavities 14 of the forming surface 12. The dosing apparatus 36 is arranged in an intermediate position between the first position 24 and the second position 32. The dosing apparatus 36 fills the recesses of the first continuous water-soluble film 20 with one or more compositions. After the recesses of the first continuous water-soluble film 20 have been filled with the compositions, the second continuous water-soluble film 30 is applied onto the first continuous water-soluble film 20, so as to enclose the metered amounts of compositions contained in the recesses between the first and the second continuous water-soluble film 20, 30.

The machine 10 comprises a wetting unit 38 configured to wet a surface of the second continuous water-soluble film 30 upstream of the second position 32. The wetting unit 38 comprises a wetting roller 39 that is in contact with the surface of the second continuous water-soluble film 30, which will be placed in contact with the first continuous water-soluble film 20.

The machine 10 may comprise a pressure roller 40 configured to press the first and second continuous water-soluble films 20, 30 against the forming surface 12 in the contact areas surrounding the cavities 14 containing the metered compositions. The first and second continuous water-soluble films 20, 30 are water-bonded to each other at respective contact areas surrounding the recesses containing the metered compositions.

Figure 2:
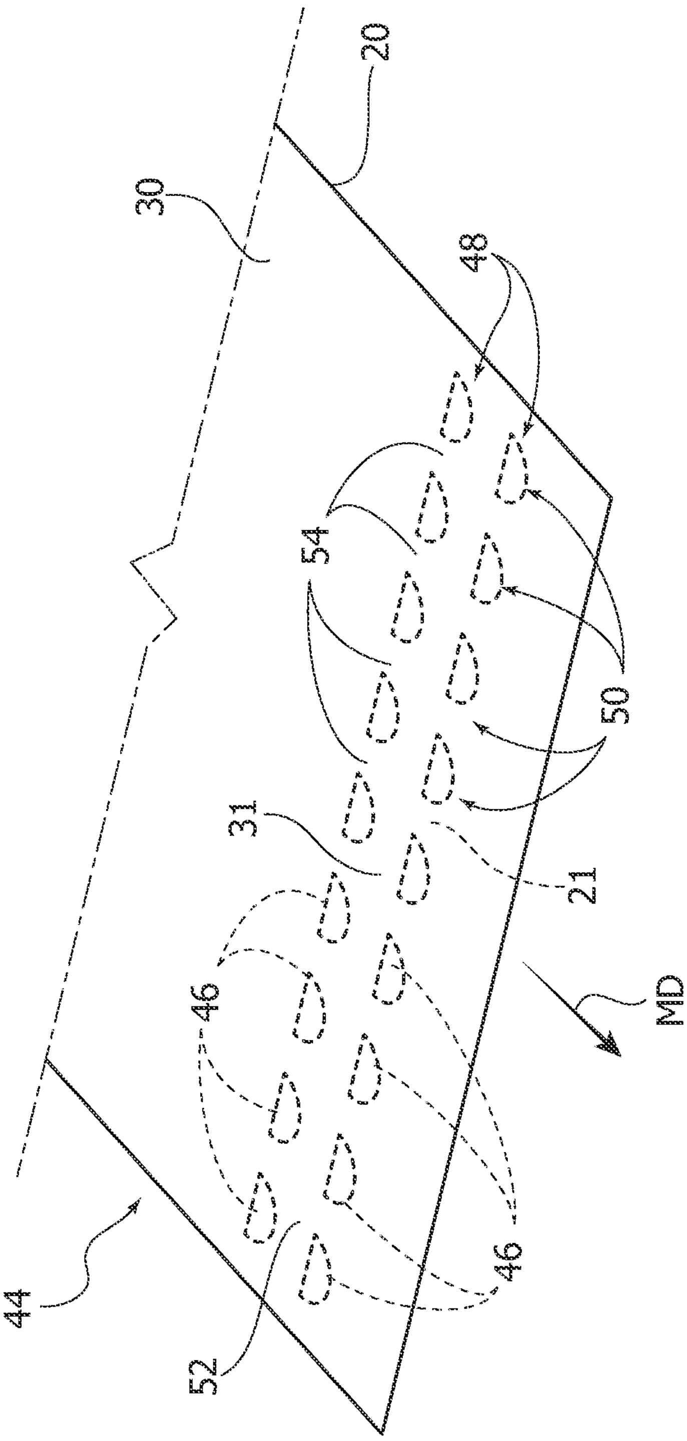
FIG. 2 is a schematic perspective view showing a water-soluble tape.

With reference to FIG. 2, after the reciprocal bonding between the first and second continuous water-soluble films 20, 30, a water-soluble tape 44 is formed. Within the water-soluble tape 44, single-dose capsules 46 are formed, connected and separated from each other by flat areas 52, 54 comprising a first side 21 and a second side 31.

The single-dose capsules 46 are arranged in transverse rows 48 and longitudinal rows 50. The single-dose capsules 46 of the transverse rows 48 are joined together by transverse flat areas 52, and the single-dose capsules 46 of the longitudinal rows 50 are joined together by longitudinal flat areas 54. In the flat areas 52, 54, the first and second continuous water-soluble films 20, 30 are joined in contact with each other.

The flat areas 52, 54 may have a thickness of between microns and 400 microns.

In a possible embodiment, the single-dose capsules 46 protrude outwards from the first side 21, i.e. from the side of the first water-soluble film 20.

In a possible embodiment, the single-dose capsules 46 protrude outwards from the second side 31, i.e. from the side of the second water-soluble film 30.

The machine 10 comprises a longitudinal cutting unit and a transverse cutting unit 62, which cut the water-soluble tape 44 along the longitudinal flat areas 54, and along the transverse flat areas 52, so as to form individual single-dose capsules 46.

In the embodiment illustrated in FIG. 1, the longitudinal cutting unit 60 is arranged upstream of the transverse cutting unit 62 with reference to the machine direction MD. In this embodiment, the longitudinal cutting unit 60 may comprise a plurality of discs 61 cooperating with the forming surface 12 and arranged to cut the water-soluble tape 44 along the longitudinal flat areas 54.

Figure 3:
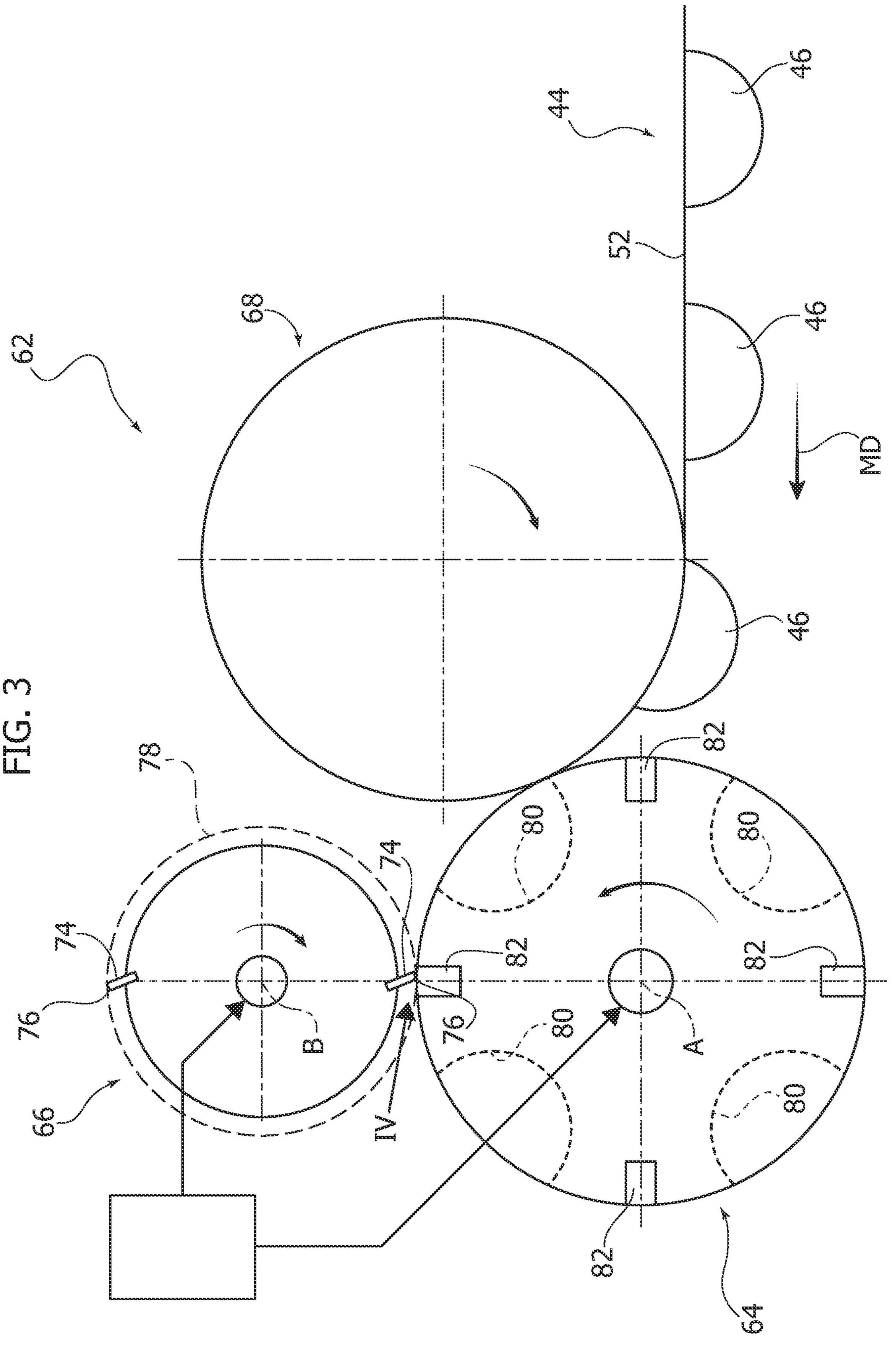
FIG. 3 is a schematic view of a transverse cutting unit indicated by the arrow III in FIG. 1.

With reference to FIGS. 1 and 3, the transverse cutting unit 62 comprises an anvil 64 and a knife roller 66, rotating around respective rotation axes A and B, parallel to each other and perpendicular to the machine direction MD. The water-soluble tape 44 passes between the anvil 64 and the knife roller 66. The knife roller 66 cuts the water-soluble tape 44 along the transverse flat areas 52.

With reference to FIG. 1, the machine 10 may comprise an inlet transfer roller 68, which transfers the water-soluble tape 44 from the forming surface 12 to the anvil 64, and an outlet transfer roller 70, which receives the individual single-doses capsules 46 from the anvil 64 and transfers them to an outlet conveyor 72.

In a possible embodiment (not shown) the longitudinal cutting unit 60 may be arranged downstream of the transverse cutting unit 62 with reference to the machine direction MD, so that the cutting of the transverse flat areas 52 is carried out before the cutting of the longitudinal flat areas 54.

With reference to FIG. 3, the knife roller 66 comprises one or more knives 74 mounted on the rotating knife roller 66 and having respective cutting edges 76 movable along a circular path 78. The number of knives 74 may vary from 1 to 10 according to the dimensions of the knife roller 66. If several knives 74 are provided, the respective cutting edges 76 are spaced apart from each other in an angular direction by an equal distance.

The anvil 64 may have a plurality of seats 80 configured to receive respective single-dose capsules 46. The seats 80 may be configured to retain the single-dose capsules 46, for example, by suction. The anvil 64 may have a plurality of contrast elements 82 that cooperate with the cutting edges 76 of the knives 74 to cut the transverse flat areas 52 of the water-soluble tape 44. The contrast elements 82 are arranged between two transverse rows of seats 80 adjacent to each other.

The anvil 64 and the knife roller 66 are driven in rotation around the respective rotation axes A and B by respective electric motors 84, 86 controlled by a control unit 88.

Figure 4:
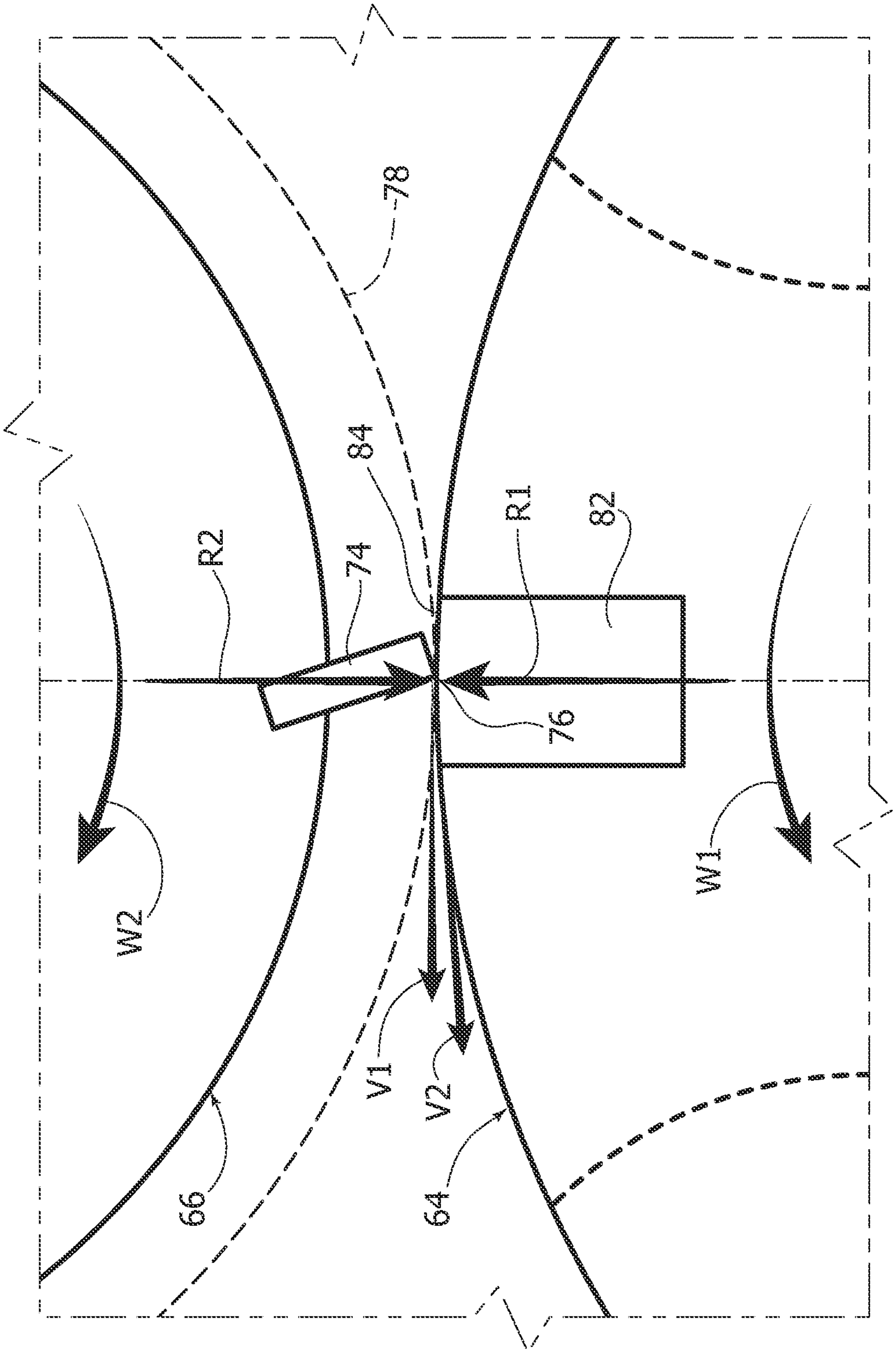
FIG. 4 is a schematic view on an enlarged scale of the detail indicated by the arrow IV in FIG. 3, and FIGS. 5 and 6 are graphs showing the variation of the peripheral speed of two embodiments of the knife roller during a complete rotation.

With reference to FIG. 4, the control unit 88 rotates the anvil 64 with a peripheral speed V1 equal to the feed rate of the water-soluble tape 44 in the machine direction MD. The peripheral speed V1 of the anvil 64 is the linear speed of the outer surfaces 84 of the contrast elements 82, which is equal to the angular velocity W1 of the anvil 64 multiplied by the radial distance R1 between the outer surfaces 84 of the contrast elements 82 and the rotation axis A of the anvil 64.

The control unit 88 rotates the knife roller 66 with a variable peripheral speed V2 along the trajectory 78. The peripheral speed V2 of the knife roller 66 is the linear speed of the cutting edges 76 of the knives 74, which is equal to the angular speed W2 of the knife roller 66 multiplied by the radial distance R2 between the cutting edges 76 of the knives 74 and the rotation axis B of the knife roller 66.

During a single cutting cycle, the rotating knife roller 66 rotates with at least one first peripheral speed V2' and with a second peripheral speed V2".

The first peripheral speed V2' is greater than the peripheral speed V1 of the anvil 64. The second peripheral speed V2" is at least 15% faster than the first peripheral speed V2'.

The rotating knife roller 66 rotates at the speed V2' when each individual knife 74 cuts the water-soluble tape 44 in a direction transverse to the machine direction MD.

In one complete rotation of the rotating knife roller 66, a number of cutting cycles equal to the number of knives 74 on the rotating knife roller 66 are performed. Each cut of the water-soluble tape 44 is carried out only one at a time by the knives 74.

In the instants wherein the cutting edge 76 of a knife 74 comes into contact with a respective contrast element 82 of the anvil 64, the peripheral speed V2' of the knife roller 66 is greater than the peripheral speed V1 of the anvil 64.

In the instants wherein the cutting edge 76 of a knife 74 comes into contact with a respective contrast element 82 of the anvil 64, the ratio V2'/V1 is between 1.1 and 1.25. In a possible embodiment, the speed ratio V2'/V1 is between 1.1 and 1.2.

It is advantageous that the speed ratio V2'/V1 does not drop to the value 1 because—in this way—it is not necessary to slow down the knife roller 66 to the peripheral speed V1 and then accelerate it again.

It is also advantageous to avoid the speed ratio V2'/V1 from exceeding 1.25 to avoid risks of incomplete cuts, breakage of the capsules, snags in the line, and malformations of the cutting profile along the flat areas.

In a possible embodiment, the ratio between the first peripheral speed V2' and the speed V1 is between 1.1 and 1.12. In this range, there are no incomplete cuts, broken capsules, snags in the line or malformations of the cutting profile along the flat areas. Compared to the wider range, in this case, the risks of malfunctions are absent, while with the wider range malfunctions are possible, although with a very low probability (about 2%). After having performed a cut, the peripheral speed V2 of the knife roller 66 increases to the value V2" to align the knife 74, or a subsequent knife 74, with the successive contrast element 82 in a subsequent cutting step.

Figure 5:
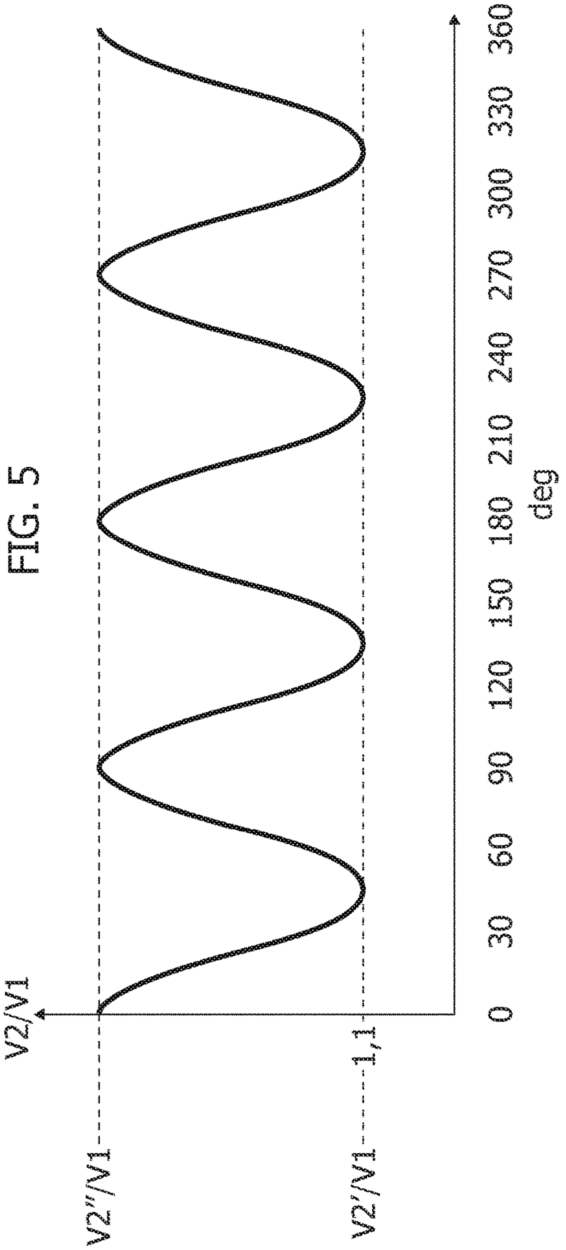
Figure 6:
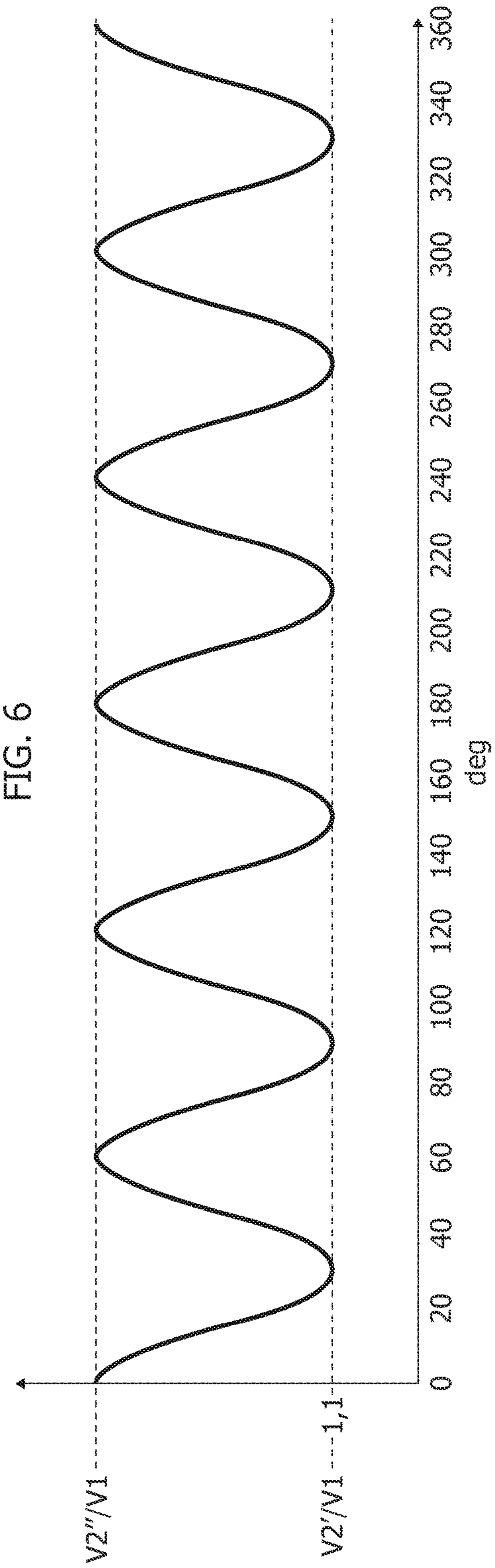

The graphs of FIGS. 5 and 6 show the variation of the ratio V2/V1 during a complete rotation of the knife roller 66. FIG. 5 refers to a knife roller 66 having four knives 74 and FIG. 6 refers to a knife roller 66 having six knives 74. The areas of the graphs wherein the V2/V1 ratio is minimum (equal to approximately 1.1) are the instants wherein the transverse cuts of the water-soluble tape 44 take place.

The difference between the peripheral speed V2' of the cutting edge 76 of the knife roller 66 and the peripheral speed of the anvil 64 during the cutting of the water-soluble tape 44 causes the point of contact between the cutting edge 76 and the anvil 64 to move between the instant of starting the cut and the instant of ending the cut. Since, during the cutting step, the peripheral speed V2' of the knife roller 66 is higher than the peripheral speed V1 of the anvil 64, the knife roller 66 disengages from the anvil 64 into a more advanced relative position than the relative position in which it was engaged. This relative displacement creates a detachment and a consequent spacing apart between the two cut edges of the first and second water-soluble films 20, 30.

The fact that during cutting a distance is formed between the cut edges of the water-soluble films 20, 30 allows reduction of the compressive force and the interference with which the cut edges 76 are pressed against the respective contrast elements 82. This leads to a consequent reduction in the stresses to which the cutting system is subjected (blades, shafts, bearings and motors).

The higher peripheral speed of the knife roller 66 with respect to that of the anvil 64, other conditions being equal, also reduces the contact time between the cutting edge 76 and the anvil 66.

Of course, without prejudice to the principle of the invention, the details of construction and the embodiments can be widely varied with respect to those described and illustrated, without thereby departing from the scope of the invention as defined by the claims that follow.

The invention claimed is:

1. A method for cutting a water-soluble tape comprising the steps of:

providing an anvil, providing a rotating knife roller comprising at least one knife having a cutting edge extending outwards from said rotating knife roller, providing a water-soluble tape comprising flat areas comprising a first side and a second side, and single-dose capsules formed inside the water-soluble tape, wherein the single-dose capsules are connected and separated from each other by the flat areas, advancing said water-soluble tape in a machine direction at a speed between said anvil and said rotating knife roller with said first side of the water-soluble tape in contact with the anvil, and cutting said water-soluble tape with said at least one knife while said water-soluble tape passes between said anvil and said rotating knife roller, wherein, during a single cutting cycle, the rotating knife roller rotates with at least one first peripheral speed and a second peripheral speed, wherein the second peripheral speed is at least 15% faster than the first peripheral speed and wherein the rotating knife roller rotates at the first peripheral speed when a knife of the at least one knife cuts said water-soluble tape in a direction transverse to the machine direction, wherein a ratio between the first peripheral speed and the speed of the water-soluble tape is comprised between 1.1 and 1.25.

2. The method of claim 1, wherein the ratio between the first peripheral speed and the speed of the water-soluble tape is comprised between 1.1 and 1.12.

3. The method of claim 1, wherein said at least one knife of said rotating knife roller comprises from one to ten knives.

4. The method of claim 1, wherein said flat areas have a thickness of between 50 microns and 400 microns.

5. The method of claim 1, wherein the single-dose capsules project outwards from said first side.

6. The method of claim 1, wherein the single-dose capsules project outwards from said second side.

7. The method of claim 1, wherein the flat areas comprise longitudinal flat areas and transverse flat areas, the method further comprising cutting the longitudinal flat areas before cutting the transverse flat areas of said water-soluble tape.

8. The method of claim 1, wherein providing said water-soluble tape comprises:

providing a forming surface having a plurality of cavities, continuously movable in a machine direction, feeding a first continuous water-soluble film onto said forming surface in a first position, retaining said first continuous water-soluble film on said forming surface while it moves in said machine direction and forming a plurality of recesses in said first continuous water-soluble film, while maintaining the first continuous water-soluble film adherent to said plurality of cavities, dispensing metered quantities of compositions into said plurality of recesses, applying a second continuous water-soluble film onto said first continuous water-soluble film and connecting said first and second continuous water-soluble films together by water sealing around plurality of said recesses so as to enclose said metered quantities of compositions between said first and second continuous water-soluble films.

9. The method of claim 1, comprising receiving and holding said single-dose capsules of said water-soluble tape within respective seats of said anvil.

10. The method of claim 1, wherein each cut of the water-soluble tape is carried out only one at a time by knives of the at least one knife.

* * * * *